United States Patent [19]

Sakakibara et al.

[11] 4,211,257
[45] Jul. 8, 1980

[54] SOLENOID VALVE

[75] Inventors: Naoji Sakakibara, Chiryu; Nobuyuki Hashimoto, Toyota, both of Japan

[73] Assignee: Aisin Seiki Kabushiki Kaisha, Kariya, Japan

[21] Appl. No.: 944,674

[22] Filed: Sep. 22, 1978

[30] Foreign Application Priority Data

Oct. 26, 1977 [JP] Japan .................................. 52-128273

[51] Int. Cl.² ............................................ F16K 31/06
[52] U.S. Cl. ............................... 137/625.65; 251/129; 251/86; 251/139
[58] Field of Search ..................... 137/625.65; 251/139

[56] References Cited
U.S. PATENT DOCUMENTS

| | | | |
|---|---|---|---|
| 3,529,620 | 9/1970 | Leiber | 137/625.65 X |
| 3,592,438 | 7/1971 | Greenwood et al. | 251/139 X |
| 3,726,315 | 4/1973 | Sheppard | 137/625.65 |
| 3,789,811 | 2/1974 | Franz et al. | 123/117 A |
| 3,983,909 | 10/1976 | Anglade | 137/625.65 |
| 4,076,045 | 2/1978 | Nakajima et al. | 251/139 X |

*Primary Examiner*—Arnold Rosenthal
*Attorney, Agent, or Firm*—Sughrue, Rothwell, Mion, Zinn and Macpeak

[57] ABSTRACT

A solenoid-operated fluid control valve has an armature assembly which includes a reciprocally movable plate-like magnetic valve member and a seal element loosely retained by the valve member and projecting therefrom. A magnetic core defines a fluid passageway and has a valve seating surface at its one end. The valve seating surface of the magnetic core opens in a valve chamber which surrounds the side surface of the magnetic valve member to guide its movement toward and away from the valve seating surface and to maintain the seal element in alignment with the valve seating surface. The seal element has opposed conical or spherical ends and an annular recess therebetween. The seal element loosely engages with and retained by an opening of the magnetic valve member to abut concentric with the valve seating surface of the magnetic core in spite of a slight eccentricity of the assembly within the valve chamber. The solenoid-operated fluid control valve also has a compression spring positioned concentric with the magnetic valve member and bears at one end against the magnetic valve member and a solenoid mounted on a bobbin in which the magnetic core is secured.

2 Claims, 5 Drawing Figures

Fig. 1 Prior Art
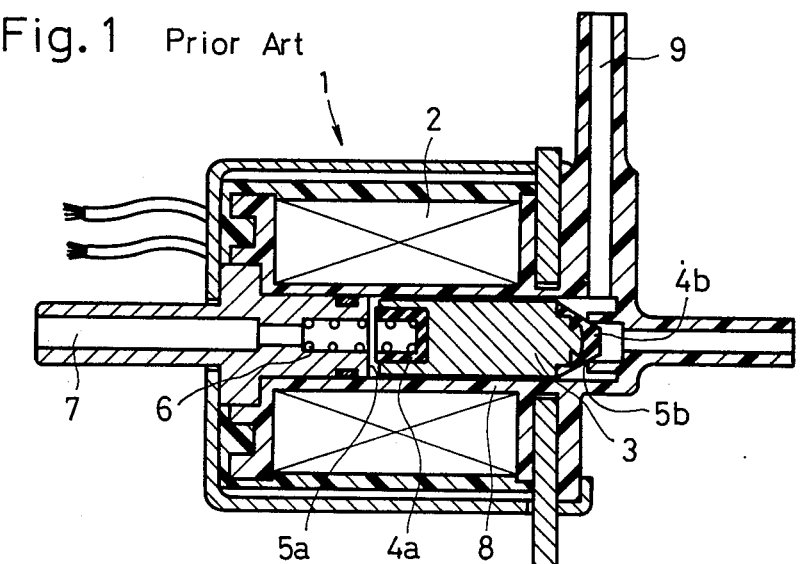
Fig. 2
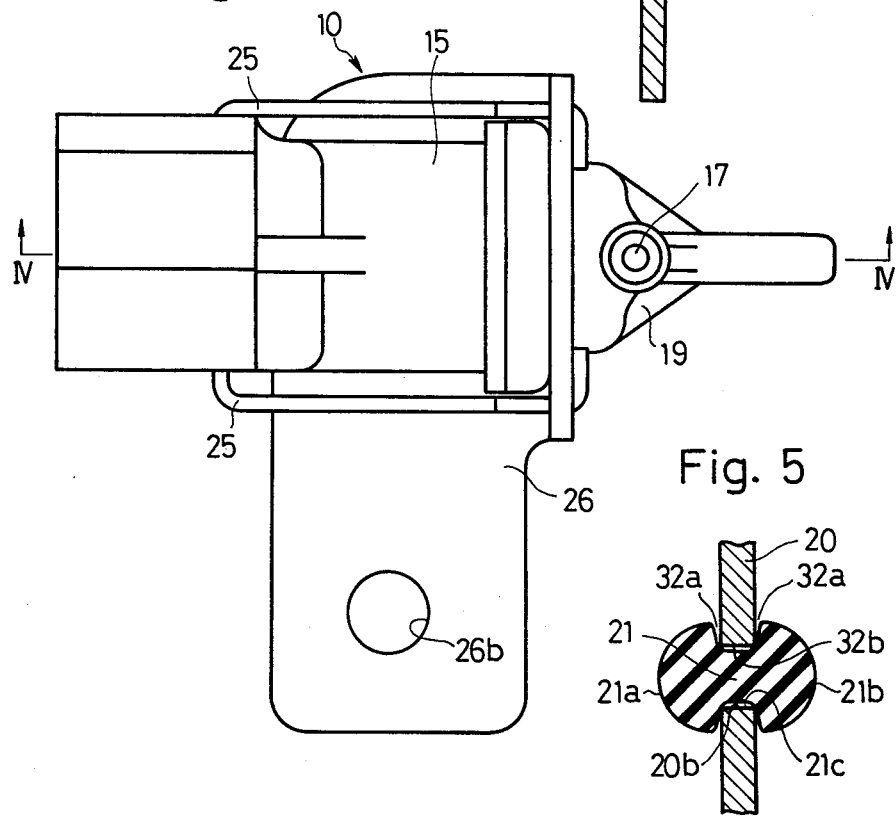
Fig. 5

SOLENOID VALVE

BACKGROUND OF THE INVENTION

This invention relates in general to solenoid operated control valves and deals more particularly with the valves which have a spring pressed valve member and a solenoid for displacing the valve member such as disclosed on U.S. Pat. Nos. 3,013,768 and 4,027,850.

The valves foredescribed are desired to be small, light and vibration-resistant for installing them on automotive vehicles. The valves may become relatively light and vibration-resistant by reducing the weight of the armature assembly of the valves. However the reduction of the weight of the armature assembly gives rise to variations in the compression force of a spring against a valve member of the armature assembly, which cause the valve member an inclined slight eccentricity against a valve seat to which the valve member is yieldably urged by the compression force of the spring. The eccentricity loosens the intimate closure of an opening of the valve seat with the valve member.

Accordingly, hitherto known solenoid valves have an elongated magnetic plunger for eliminating the eccentricity. One of the valves is shown in FIG. 1. The solenoid valve shown in FIG. 1 has an elongated hexagonal plunger 3 slidably fitted in a cylindrical bobbin 8. A solenoid 2 is mounted on the bobbin 8. The plunger 3 has sealing elements 4a and 4b at its opposed ends. The interior surface of the bobbin 8 surrounds a main elongated portion of the plunger 3 to guide its movement toward and away from valve seats 5a and 5b without inclination of the plunger 3 whereby to abut the sealing element 4a and 4b concentric with the valve seats 5a and 5b respectively. The plunger 3 is normally urged toward the valve seat 5b by a spring 6 as shown in FIG. 1 whereby the sealing element 4a is away from the valve seat 5a and the sealing element 4b abuts on the valve seat 5b. A port 7 communicates with a port 9 through a gap between the sealing element 4a and the valve seat 5a as well as a clearance between the outer surface of the hexagonal plunger 3 and the interior surface of cylindrical bobbin 8. When the solenoid 2 is energized the plunger 3 moves toward the valve seat 5a against the action of the spring 6 whereby the sealing element 4a abuts on the valve seat 5a and the sealing element 4b is away from the valve seat 5b. Thus the communication between the ports 7 and 9 is interrupted.

The valve 1 is relatively lengthy and heavy because it has elongated solid plunger 3. Thus the employment of the elongated plunger contradicts the requirements that the valves should be small, light and vibration-resistant for the use of automotive vehicles. Although the plunger may be a hollow or cylindrical one, the diameter of the cylindrical plunger should be large enough to maintain a predetermined magnetic reluctance. Thus the plunger and the valves may become bulky.

SUMMARY OF THE INVENTION

The present invention has for its object the provision of a solenoid valve which fulfill the requirements mentioned in the immediately preceding paragraph.

In accordance with the present invention an improved solenoid-operated valve is provided which has an armature assembly including a reciprocally movable platelike magnetic valve member and a seal element loosely retained by the valve member and projecting from the valve member. The valve further includes a magnetic core member, a solenoid which surround the magnetic core member and a spring which urges the platelike magnetic valve member toward a first direction of the reciprocal movement of the platelike magnetic valve member. An end of the magnetic core member faces to the platelike magnetic valve member to urge the magnetic valve member toward a second direction of the reciprocal movement against the action of the spring during an energization of the solenoid. The platelike magnetic valve member retains the seal element loosely so as to make free a inclining and/or eccentric movement of the seal element against the platelike magnetic valve member.

In a preferred embodiment of the present invention, the magnetic core member is a cylindrical one having a fluid passageway along its axis and a valve seat which faces to the seal element and communicates with the fluid passageway. When the solenoid is energized the platelike magnetic valve element is urged to the core member by the magnetic action of the core member whereby the seal element moves toward the valve seat of the core member and abuts on the valve seat. Assuming that there is a slight eccentricity between the valve seat and the seal element, the seal element follows to the eccentricity to concentrate into the valve seat.

BRIEF DESCRIPTION OF THE DRAWING

FIG. 1 is a vertical sectional view through a solenoid-operated fluid control valve of the prior arts;

FIG. 2 is a plan view of a solenoid-operated fluid control valve embodying the invention;

FIG. 5 is a somewhat enlarged fragmentary vertical sectional view of the seal element shown in FIG. 4.

DETAILED DESCRIPTION OF PREFERRED EMBODIMENT

Figure 3:
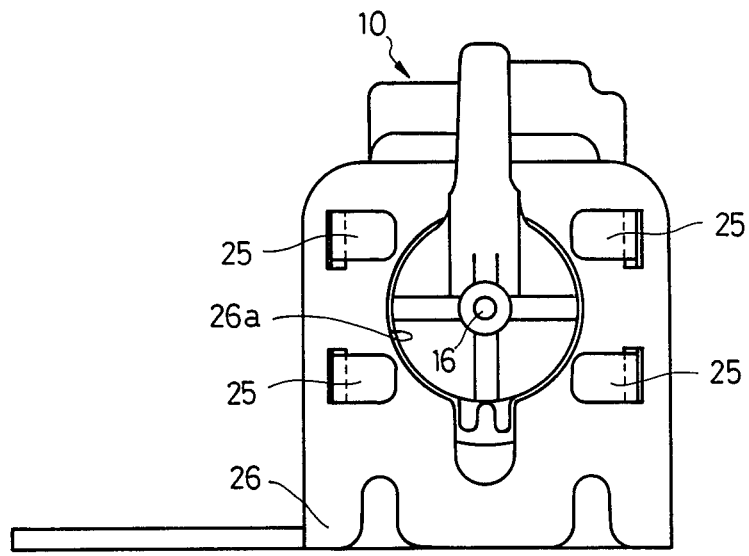
FIG. 3 is a right side view of the solenoid-operated fluid control valve shown in FIG. 2.
Figure 4:
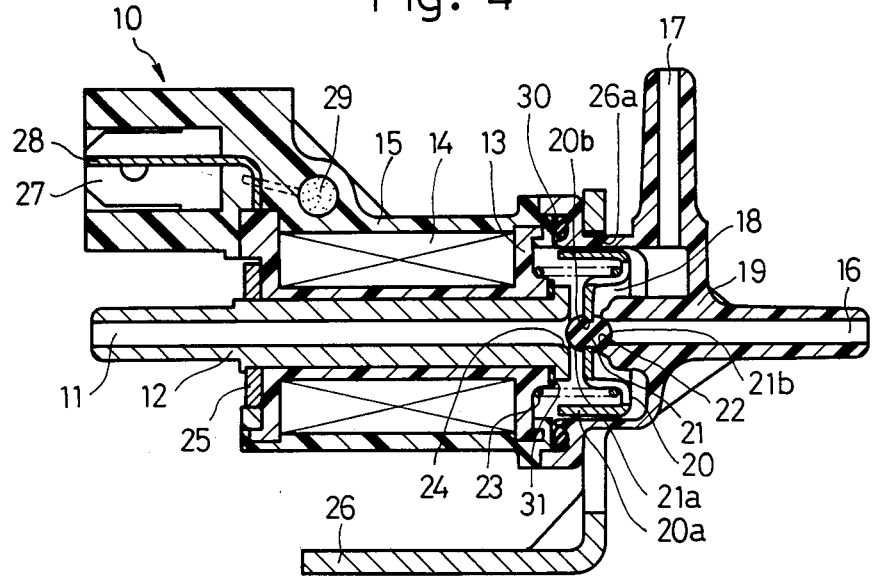
FIG. 4 is a vertical sectional view through the solenoid-operated fluid control valve shown in FIG. 2.

Turning now to FIGS. 2 through 5 and referring particularly to FIG. 4, a solenoid-operated control valve embodying the present invention is designated generally by the numeral 10. The valve 10 comprises a magnetic valve core 12 having a port 11; an annular magnet coil 14 which surrounds a bobbin 13 to which valve core 12 is secured; a non-magnetic protection cover 15 which surrounds annular magnet coil 14; a non-magnetic cover 19 which has ports 16, 17 and forms with bobbin 13 a valve chamber 18 which communicates with ports 11, 16 and 17; a valve member 20 inserted in valve chamber 18 and made of a magnetic metal plate by pressing it; a seal element 21 loosely retained by a center opening 20b of valve member 20; a compression spring 23 contained within valve chamber 18, which urges valve member 20 toward an opening of port 16; magnetic yokes 25 which are connected with magnetic core 12 and extend along the outer surface of protection cover 15; a magnetic bracket 26 having a vertical and horizontal arms, vertical one of which has an opening 26a surrounding valve chamber 18 and horizontal one has an opening 26b to make easy an installation of the valve 10 to a body of an automotive vehicle or an engine with a nut; connectors 27, 28 which are connected with both terminals of magnet coil 14 and partially embedded in cover 15; a resistor 29 which is connected between the connectors 27, 28 and embedded in cover 15; a sealing ring 30 between a flange of cover 15 and an annular recess of cover 19; and a gasket 31 inserted between the outer flange of valve core 12 and an end of bobbin 13. The magnetic yokes 25 are engaged with magnetic valve core 12 at their one ends whereas the other ends of magnetic yokes 25 pass through openings of the vertical arm of bracket 26 and then bended as shown in FIG. 3 whereby valve core 12, bobbin 13, covers 15, 19 and bracket 26 are rigidly combined together by the magnetic yokes 25. The valve member 20 has a cylindrical side wall 20a as shown in FIG. 4, which faces to the opening 26a of vertical arm of bracket 26. The seal element 21 is made of a resilient substance such as a rubber and formed an annular recess 21c between spherical ends 21a, 21b. The annular recess 21c of seal element 21 engages with the edges of opening 20b of valve member 20. However the annular recess 21c of seal element 21 is provided with outwardly diverging walls to leave clearances 32a between the surface of valve member 20 and inner side walls of recess 21c and a clearance 32b is provided between opening 20b of valve member 20 and the bottom of recess 21c. Therefore, the seal element 21 is, in a predetermined range, movable laterally in opening 20b of valve member 20 and may incline with respect to the axis of opening 20 in accordance with a force urged on spherical surface 21a or 21b. A tapered valve seat 22 is formed at the opening of port 16 to abut with spherical surface 21b of seal element 21. A tapered valve seat 24 which communicate with port 11 is formed at the end of valve core 12 to abut with spherical surface 21a of seal element 21. Instead of the spherical surfaces 21a, 21b, another tapered surface such as cone or truncated cone surface may preferably formed at the opposed ends of seal element 21.

At the state of de-energization of coil 14, valve member 20 is urged toward valve seat 22 by the action of compression spring 23 whereby spherical surface 21a of seal element 21 is away from valve seat 24. Thus port 11 communicates with port 17 through valve chamber 18. The port 16 is interrupted from valve chamber 18 because spherical surface 21b of seal element 21 abuts on valve seat 22.

When coil 14 is energized a magnetic flux is generated in valve core 12, which passes yokes 25, bracket 26 and valve member 20 and a magnetic attractive force is generated between the end surface of valve core 12 and valve member 20. Therefore valve member 20 moves toward valve seat 24 against the action of spring 23 to abut spherical surface 21a of seal element 21 on valve seat 24. Thus port 11 is interrupted from valve chamber 18 and port 17 communicates with port 16 through valve chamber 18. At closure of valve seat 24 by spherical surface 21a, seal element 21 displaces laterally or inclines to fit spherical surface 21a into valve seat 24 intimately even if there is a slight eccentricity of seal element 21 with respect to valve seat 24 or spring 23 applies eccentric spring force on valve member 20, because the seal element 21 loosely retained with the valve member 20. If seal element 21 were rigidly retained with valve member 20 and spring 23 applied eccentric spring force on valve member 20, valve member might incline and displace from concentric position whereby spherical surface 21a might deviate slightly from the center axis of valve seat 24. The inclination of valve member 20 might cause deviation of the magnetic attractive force between valve member 20 and the end surface of valve core 12 whereby the inclination of valve member 20 might increases. Therefore seal element 21 could not close valve seat 24 sufficiently if seal element 21 were rigidly retained with valve member 20 and the eccentricity of seal element 21 or the spring force might exist. However spherical surface 21a intimately abuts on valve seat 24 according to the present invention because the seal member 21 loosely retained with the valve element 20 and spherical surface 21a inclines or moves laterally in the opening 20b of valve element to concentrate into the concaved surface of valve seat 24.

The solenoid-operated fluid control valve 10 shown in FIGS. 2 through 4 and described hereinbefore may be employed for controlling idling throttle opening of an engine with a vacuum actuator, in which case port 11 communicates with the atmosphere, port 16 communicates with a vacuum pressure source and port 17 communicates with a vacuum chamber of the actuator which increases throttle opening of the engine in response to the degree of the vacuum in its vacuum chamber. When the load of the engine increases e.g. a power steering device is actuated, engine troubles such as an engine stop are prevented by energizing the coil 14 of the valve 10, because the valve 10 communicates the vacuum chamber of the actuator with the vacuum pressure source through port 16, chamber 18 and port 17 of the valve 10 whereby the actuator increases the throttle opening to accelerate idling rotational speed of the engine.

According to the present invention, the valve member 20 is made of a magnetic plate which is relatively light as compared with the elongated magnetic plunger of well known solenoid-operated valves and the seal element 21 having tapered edges at its opposed sides is loosely retained with the valve member 20 to permit its inclination and lateral displacement in a predetermined range. Therefore, the valve 10 is relatively light, compact and vibration-resistant and attains stabilized closure operation.

What is claimed is:

1. A solenoid operated fluid control valve comprising an armature assembly, an electromagnetic assembly, valve chamber, fluid passageways and magnetic path assembly, said armature assembly including a platelike magnetic valve member having an opening therethrough reciprocally movable in said valve chamber, a seal element of resilient material loosely retained by the valve member for pivotal movement only and a spring urging the valve member in a first direction of its reciprocal movement in said valve chamber, said electromagnet assembly including a coil and a magnetic core fixed with respect to the coil and having a tapered valve seat at its end which faces toward the opening in said valve member, said seal element having at least one tapered projection, which extends toward the tapered valve seat, said seal element having an annular recess having a bottom portion spaced from said opening and outwardly diverging side walls in constant engagement with the peripheral edges of said opening at each end of the opening respectively thereby allowing said seal element to pivot in said opening, one of said fluid passageways communicating with said tapered valve seat, the other of said fluid passageways communicating with the valve chamber, said magnetic path assembly including magnetic members which form a magnetic flux path from an outer end of said magnetic core to the vicinity of the edge of said valve member.

2. A solenoid-operated fluid control valve having a valve body defining a valve chamber, aligned inlet and outlet fluid passageways each respectively communicating between the exterior of the valve body and the chamber, a magnetic core defining a valve seat and one of said inlet and outlet passageways, means defining a valve seat for the other of said passageways, an armature assembly including a magnetic valve member having an opening aligned with said passageways supported in the chamber for reciprocal movement between said valve seats and a seal element of resilient material loosely mounted on the valve member for pivotal movement only, said seal element having a tapered seating surface projecting outwardly from each side of the valve member and an annular recess therebetween having a bottom portion spaced from said opening and outwardly diverging side walls in constant engagement with the peripheral edges of said opening respectively thereby allowing said seal element to pivot in said opening, each tapered seating surface being engageable with a respective valve seat for sealing engagement with the valve seat to prevent the communication between the respective fluid passages and the valve chamber, a spring yieldably urging the valve member toward one valve seat and a solenoid mounted on the magnetic core for urging said valve member toward the other valve seat, said solenoid being adapted to generate a magnetic flux in the magnetic core and magnetic flux path members transmitting a magnetic flux emerging from the outer end of the magnet core to the vicinity of the side edge of the valve member.

* * * * *